Figure 1:
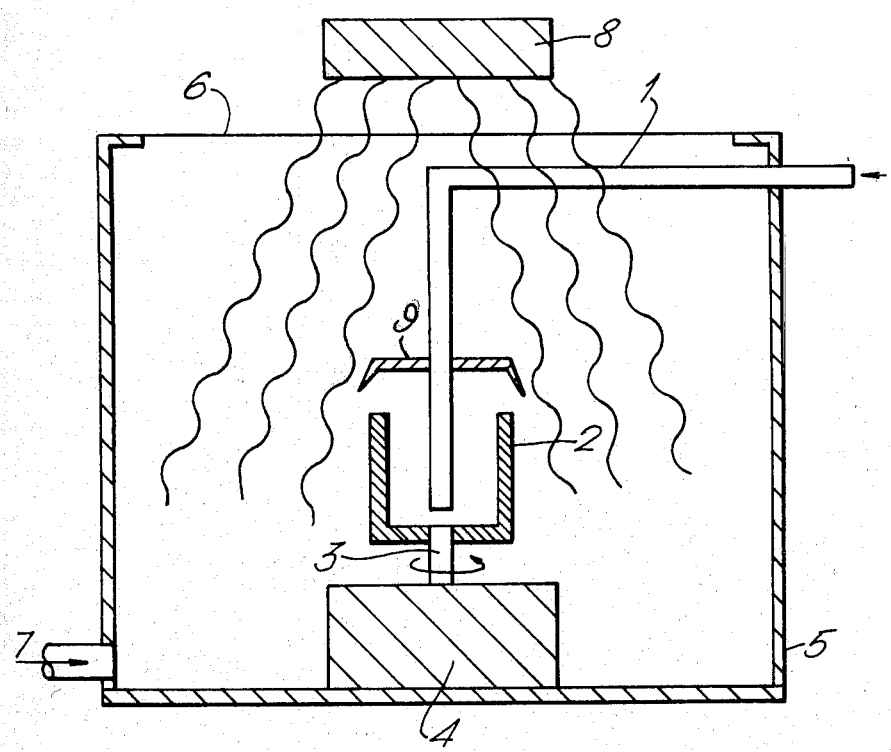

United States Patent [19]

Cowen et al.

[11] 4,356,133

[45] Oct. 26, 1982

[54] CHEMICAL PROCESS IN A MEDIUM CONNECTED TO A ROTATING BODY

[75] Inventors: Geoffrey Cowen; Philip Norton-Berry; Margaret L. Steel, all of Runcorn, England

[73] Assignee: Imperial Chemical Industries Limited, London, England

[21] Appl. No.: 14,233

[22] Filed: Feb. 21, 1979

[30] Foreign Application Priority Data

Feb. 21, 1978 [GB] United Kingdom ................ 6810/78

[51] Int. Cl.³ .......................................... B29C 6/00
[52] U.S. Cl. .................................. 264/8; 204/159.19; 204/159.22; 264/22; 264/83; 425/8
[58] Field of Search ................ 425/8; 264/8, 22, 82, 264/83; 204/159.19, 159.22

[56] References Cited

U.S. PATENT DOCUMENTS

| | | | |
|---|---|---|---|
| 1,357,206 | 10/1920 | Fuller | 264/8 |
| 2,341,536 | 2/1944 | Fash | 260/425 |
| 2,368,049 | 1/1945 | Stratford | 425/8 |
| 2,489,176 | 11/1949 | Fash | 425/8 |
| 2,507,490 | 5/1950 | Cohen | 204/163 |
| 2,797,201 | 6/1957 | Veutch et al. | 425/8 |
| 3,032,456 | 5/1962 | Wade | 425/8 |
| 3,596,312 | 8/1971 | Ohmatsu | 264/8 |
| 3,617,587 | 11/1971 | Nayar et al. | 264/82 |
| 3,794,731 | 2/1974 | Dannert et al. | 264/83 |
| 4,178,336 | 12/1979 | Snowden | 264/8 |
| 4,197,063 | 4/1980 | Davidson | 425/8 |
| 4,211,736 | 7/1980 | Bvadt | 264/8 |

FOREIGN PATENT DOCUMENTS

| | | |
|---|---|---|
| 51-53013 | 5/1976 | Japan .................................. 264/12 |
| 595133 | 1/1978 | Switzerland . |
| 813869 | 1/1959 | United Kingdom . |
| 1080863 | 8/1967 | United Kingdom . |
| 1282097 | 7/1972 | United Kingdom . |
| 1333330 | 10/1973 | United Kingdom . |
| 1540171 | 2/1979 | United Kingdom . |

Primary Examiner—Jay H. Woo
Attorney, Agent, or Firm—Cushman, Darby & Cushman

[57] ABSTRACT

A reactant medium is transported across the surface of a body rotating at high speed and discharged therefrom by centrifugal force. A chemical reaction is caused to occur in the medium after the said discharge while the reactant medium is still connected to the surface of the body.

6 Claims, 7 Drawing Figures

CHEMICAL PROCESS IN A MEDIUM CONNECTED TO A ROTATING BODY

This invention relates to chemical processes involving reactions in a fluid medium.

In our co-pending U.S. application Ser. No. 14,234 filed Feb. 21, 1979 chemical processes are described wherein rotating bodies are used to produce a thin film of reactant medium on a surface. Reaction occurs in the thin film or layer of reactant on the rotating surface and the product of the reaction is discharged into a fluid, which is usually the atmosphere surrounding the periphery of the surface of rotation. The discharge occurs after the chemical reaction has started and the product may be produced in a variety of physical forms.

We have now found that the thin film or layer of reactant medium may be maintained after discharge from the periphery of the surface for an appreciable distance therefrom and chemical reaction may be conducted or continued in such form of the reactant medium whilst it is being discharged from and flung away from the surface into the fluid medium surrounding the rotating body.

According to the present invention there is provided a chemical process wherein a reactant medium supplied to the surface of rotation of a body rotating in a fluid is moved across the surface and discharged from the periphery thereof into the surrounding fluid by the centrifugal force of the rotating body, chemical reaction of the reactant medium to form a chemical product occurring after the said discharge thereof from the surface has taken place but whilst the reactant medium is still joined to the rotating body. For example the reactant medium immediately after discharge is usually still formed as a thin film in the shape of a flange around the periphery of the rotating vessel. The product is sometimes discharged as filaments or alternatively the said film breaks up quickly as it is discharged into thin filaments and the chemical reaction may usefully take place in or on those filaments while they are still physically joined to the periphery of the surface of the rotating body before they break away and pass individually through the fluid surrounding the rotating body.

The fluid surrounding the rotating body may be liquid but it is preferably a gas or vapour because of the greater ease of rotation and discharge through low density non-viscous media. Chemical reaction of the discharged reactant medium may occur by reason of the reactants of the fluid into which it is discharged.

The film and the filaments described above which may be of the reactant medium or partially of product and reactant medium are no longer supported on the rotary surface but they are suspended in the fluid, usually the atmosphere around the rotating body and fly outwards away from the body. They may be moving radially outwards or alternatively they may be bent around to move tangentially by reason of the circumferential drag imposed by the viscosity of the fluid around the rotating body. Various forms of circulating currents may be set up around the rotating body for example by means of fans or impellers attached to the body or alternatively by means of independent air-blowers both of which may modify the shape of and the direction of the film or filament which is discharged from the surface and which in this invention is undergoing the said chemical reaction.

The reactant medium may consist of one or more reactants in liquid form, a fluent slurry of solid and liquid reactants, any reactants in a liquid diluent, a foam or free-flowing dry powder. The chemical reaction, which may be organic or inorganic, includes reactions of gas, liquid or solid present in the reactant medium. The medium should be capable of spreading and moving over a surface, under the influence of suitable forces, the extent and speed of such movement obviously being governed inter alia by the viscosity and density of the medium and the surface tension and surface friction between the medium and the surface. We prefer the reactant medium to consist essentially of fluid materials and to contain no solid phase when it is discharged from the surface of the body.

The rotating body preferably has a coaxial surface of rotation and may be for example a solid body, a hollow body or a shaped vessel; the surface of rotation accordingly may be either an external and/or an internal surface of the body. Examples of preferred bodies are cylindrical or conical vessels (especially bowls, cones or daibolos) the surfaces of rotation in all cases having a central axis and at least part of that surface being inclined to the axis at an angle of less than a right angle.

IN THE DRAWINGS

FIG. 1 is a vertical sectional view of an apparatus embodying the principles of the present invention; and FIGS. 2A, 2B, 2C, 2D, 2E and 2F are vertical sectional views of six different shapes suitable for the body of revolution.

Figure 2:
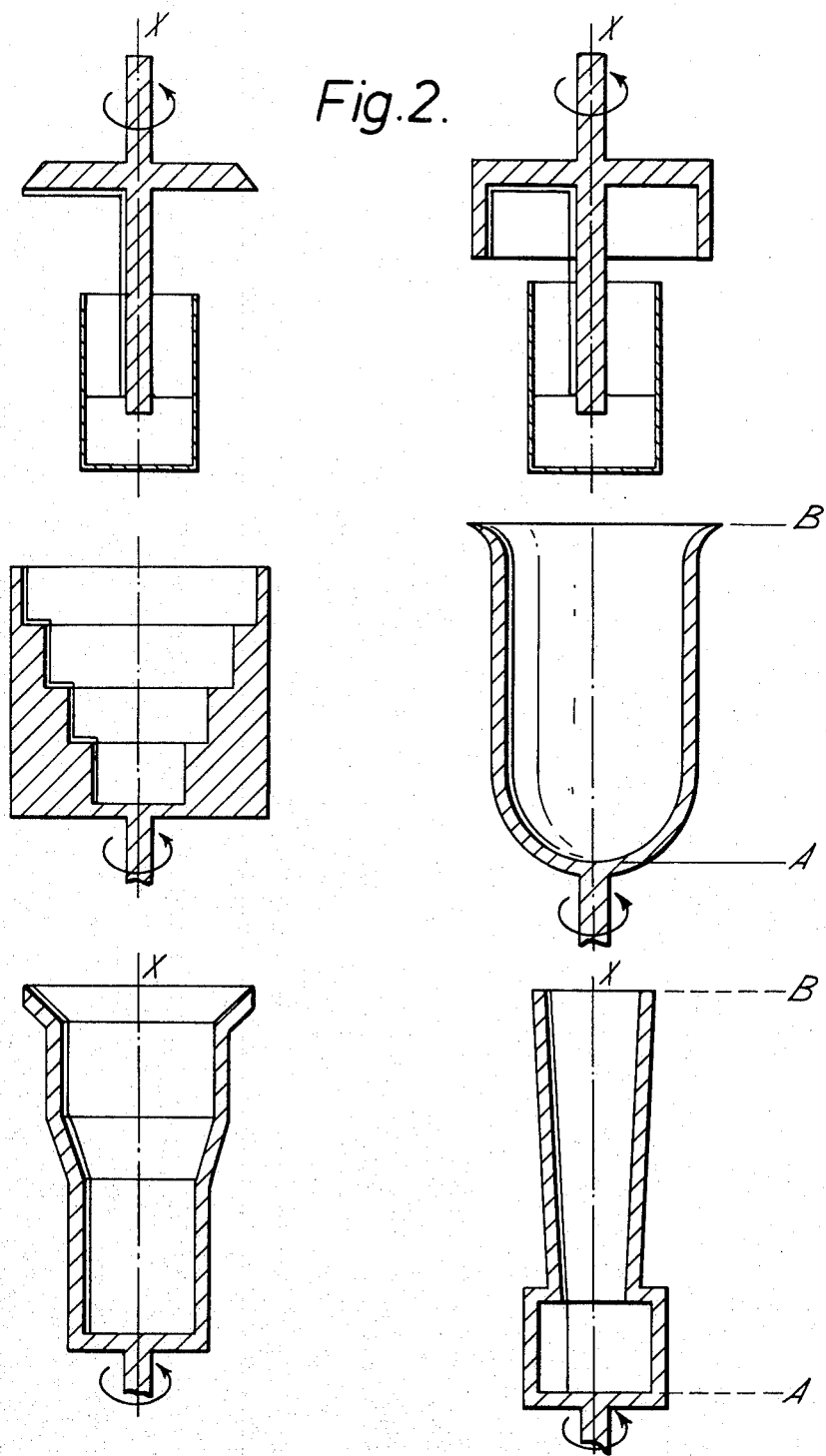

Thus a variety of shapes are possible for a body useful in this invention, those preferred having a surface of rotation which both varies in diameter and extends in an axial direction (X . . . . X). The bodies especially preferred are cups and bowls which may usefully have a flanged rim and/or substantially vertical sides if desired. The rotation of the body will generate forces which will operate on a liquid supplied to the surface, forces which include mainly a centrifugal force operating radially from the axis of rotation and a rotary force operating circumferentially at the surface of rotation. The rotary force overcomes any inertia of the reactant medium on the surface and imparts a rotary motion to it, due to frictional drag between surface and medium. If the rotating body dips into a reservoir of liquid as illustrated in FIGS. 2A and 2B, (for example the reactant medium may be supplied to the surface in this manner) the rotary force will impart a stirring or shearing action to the liquid. This, depending on the viscosity and surface tension may cause the liquid to climb out of the reservoir as a result of the Weissenberg effect, and so spread on the outside (or inside) surface of rotation of the rotating body. FIGS. 2B 2C, 2D, 2E and 2F illustrate bodies of rotation which are bowl shaped, where rotation of the bowl about its vertical axis x causes reactant mixture in the bowl to climb up the internal surface of the bowl to be discharged from the rim.

Without prejudice to the process of the present invention we believe that the centrifugal force which operates in a direction away from the axis of rotation and perpendicular to that axis, will tend to fling the reactant medium off an exterior surface of rotation unless it is held by other forces, for example, cohesion, adhesion surface tension, etc. When these forces operate thin-spreading films can be obtained on a surface of rotation and may be discharged as film from the periphery thereof.

The axis of rotation may be other than vertical although this is the most convenient and most preferred direction for the axis of rotation in this invention. The rotary propulsion may be applied to the body by a shaft from either end of the axis (e.g. from the top or the bottom if it is a vertical axis) or by other means e.g. turbo-propulsion.

The magnitude of forces generated by the rotation of the body which operate upon the reactant medium to move it across the surface will be dependent upon many factors which include the speed of rotation and the radius of the surface of rotation. The greater the speed of rotation and the greater the radius the larger is the centrifugal force.

The product may be discharged from the surface in a variety of forms for example as fibres or filaments which are joined to the surface for a finite time after discharge. If the product is required finally in the form of solid or liquid particles or as a sheet of liquid continuous with the liquid film on the surface they may be produced by break-up of the filaments or ligaments in which the chemical reaction occurs whilst they are joined to the surface. All forms of the product may change from the liquid to the solid state after discharge not only due to reaction occurring but merely by cooling or evaporation of solvent. It is convenient to place collecting apparatus around the rotating body to receive the product, the apparatus taking whatever form is appropriate to the type of product obtained. The process of the invention is particularly advantageous for the production of insoluble polymeric products in fibrous form for example staple fibre especially a tangled wood, tow, fleece or non-woven fabric of fibres.

If a body is rotating and a fluent reactant medium is fed continuously to the surface of the body the movement of the medium across the surface to the discharge zone and the discharge into the surrounding fluid (and any reaction therewith) will continue whilst the body is rotating. It may be necessary to apply lengthy and perhaps tedious trial and error adjustments in order to arrange the balance of parameters for optimum yield of product but it may be seen that a continuous chemical production process may be conducted with the simplest of apparatus. The process has many advantages. The reaction takes place in a thin film or in thin filaments and therefore contact with gas in the surrounding atmosphere may be rapid and complete. Heat transfer problems are minimised because there is immediate and virtually complete contact by all portions of the reactant medium with the surrounding atmosphere which may be arranged to be above or below ambient temperature outside the apparatus.

The reactor used in the present invention is superior to many other reactors in that the film of fibres are formed and transported solely by means of the rotation of the body. The rate of throughput of reactant and/or product may be increased simply by increasing the speed of rotation: there is no need to change the apparatus. Also other factors may be altered without changing the apparatus such as the nature or viscosity of the reactant medium, the gases or other fluids surrounding and possibly reacting with the medium, and additionally the length of time of or other environmental conditions of the reaction. Therefore a large variety of different chemical reactions may be carried out in the same apparatus, for example homogeneous or heterogeneous reactions to make monomeric or polymeric products; reactions which may include, for example, polymerisation by opening double bonds or condensation processes and redox reactions using gaseous oxygen or hydrogen.

The reaction may be initiated by a variety of methods including thermal or photochemical, ionic or free-radical. Catalysts or promoters are usefully incorporated in the reactant medium whilst it is on the surface of the rotating body but conditions are arranged so that they act as the medium is discharged from the surface. For example a volatile inhibitor may be incorporated in the reactant medium, an inhibitor which evaporates quickly upon discharge from the surface and thus a rapid reaction may be allowed to occur just at the optimum time or place.

Changing from one chemical reaction to another is also easy because cleaning problems are minimised by the self-cleaning action of the apparatus: since the reactants are discharged in general from a smooth surface, there is almost complete removal.

Thus minimal residues remain to be cleaned away before a different reactant medium is introduced to the surface of the rotating body for re-use in a process to produce a different product. The invention is particularly applicable to the production of a polymeric product by a condensation process wherein the rapid evolution of a volatile product, e.g. water enables the process to be completed in the minimum time or to the production of a gelled or cross-linked polymeric product in finely divided form after a cross-linking or gelling agent has been added to a solution or melt of the polymer on the rotating surface.

The properties of the solid product produced are determined by the nature of the polymeric and monomeric components of the resin, their ratio and the degree of cross-linking, polymerisation or chain-entanglement achieved. The components of the resin should preferably be compatible, one with the other in order that a homogeneous mixture is obtained ready for curing as it leaves the surface of rotation.

The product of such cross-linking reactions may be either three-dimensionally cross-linked polymeric structures or interstitial polymeric structures (i.e. polymer networks consisting of two or more polymers) in which no chemical bonding exists between the different polymers. Fibres of either type spun from the rim of a rotating bowl as ligaments which are hardened to solid fibres as they form ligaments by thermal or photo curing reactions or by reaction with gases in the atmosphere are useful products of this invention. Typical resins which may be hardened by the photochemical process into fibres include unsaturated polyester resins and polyvinylurethane resins.

The judicious use of photoinitiator (and, if necessary, accelerator) can ensure the correct degree of cross-linking just at the right time, when irradiated under appropriate intensity of light.

Problems often encountered in photo-chemical processes, e.g. fouling window materials are minimised in this invention. Advantageously the beam of light may be generated by a laser which is well known to produce a very high intensity, pencil beam of coherent light very well defined in wave length.

The pencil beam of a laser source may usefully be focussed onto a portion of the discharged medium (for example a portion adjacent the rim or flange of a rotating cup or bowl) and may be used to modify the product as it is discharged. For example a polymeric product may be cross-linked thereby and thus stabilised in a desired form, especially a fibrous or particulate form, very conveniently and uniformly without the need for a subsequent treatment. Alternatively the source may emit high energy electromagnetic radiation such as X-rays or γ-rays and high energy microwaves or particles such as electrons and α-particles may be used if desired. Films and fibres produced by discharge from the rotating surface may be coated with a different surface layer or skin by reaction with the gases and vapours in the atmosphere or with another material brought into contact with the surface for example by spraying.

The following example illustrates but does not limit the invention and serves to demonstrate the technique of photo-crosslinking a thermosetting resin whilst it is forming a fibrous product, after being discharged from the rim of a rotating bowl.

A vinyl urethane was obtained by the interaction of 2 moles of hexamethylene di-isocyanate (HDI) with one mole of oxypropylated bisphenol A and then end-capped with two moles of hydroxypropylmethacrylate. The vinyl urethane was dissolved in triethylene glycol dimethacrylate (equal weights of each) to produce a viscous resin.

To the resin was added 0.75% w/w camphorquinone and 0.5% w/w dimethylaminoethyl methacrylate which both act together as photo catalysts to promote curing of a resin. The resin was degassed under vacuum to remove oxygen and saturated with nitrogen. (Removal of oxygen is necessary to prevent the oxygen inhibition of radical polymerisation of the resin during photo-curing).

The resin was thus stored under an inert atmosphere and in the absence of light until required. The resin was fed by a peristaltic pump into the apparatus shown in FIG. 1. An inlet tube (1) was used to direct the resin towards the base of a cylindrical bowl (2) rotating at high speed (ca. 3000 rpm) about a vertical axis by means of the vertical shaft (3) driven by the motor (4).

The bowl was positioned in a large sealed box (5) having a window (6) of transparent polyethylene film stretched across an aperture in the upper wall over a framework of the box. Nitrogen was passed into the box via inlet port (7) in order to maintain a small positive pressure therein. An appropriate light source (8) e.g. Mazda 1.6 KW low pressure air-cooled mercury lamp was positioned directly above the polyethylene window at a height of ca. 1 meter in such a way as to ensure efficient irradiation of material discharged from the rim of the bowl. A circular opaque shield (9) immediately above the bowl prevented direct irradiation to the inside surface of the bowl. When the resin was supplied at a feed rate of 80 ml/min to the centre of the bowl rotating at 2,800 rpm a uniform supply of ligaments were formed from the rim of the bowl. The ligaments stretched to semi-solid filaments and were cross-linked by the light radiation whilst they were still attached to the resin near the rim of the bowl. Subsequently the filaments broke away and formed a solid fibrous product which collected on the base of the polyethylene-covered box in the form of a wool or fleece of the cross-linked resin.

What we claim is:

1. A chemical process comprising mixing reactants to form a reactant medium, moving the medium as a film across a surface of rotation on a rotating body by centrifugal force substantially without chemical reaction taking place between the reactants, discharging the reactant medium from the periphery of the rotating surface as a film or filaments which for an initial period after discharge from said surface remain continuous with the film still moving across said surface, and chemically reacting said reactants during said initial period.

2. A chemical process as in claim 1 wherein at least part of the surface of rotation is inclined to its axis of rotation at an angle of less than a right angle.

3. A chemical process as in claim 1 or claim 2 wherein the reactant medium consists essentially of fluid materials containing no solid phase when discharged from the surface of the body.

4. A chemical process as in claim 1 or claim 2 wherein a cross-linked polymeric product is formed in the reactant medium.

5. A chemical process as in claim 1 or claim 2 wherein a gaseous product is formed in the reactant medium requiring disengagement from the liquid phase of the reactant medium.

6. A chemical process as in claim 1 or claim 2 wherein the chemical reaction in the reactant medium involves a rapid thermal exchange.

* * * * *